United States Patent
Lee et al.

(10) Patent No.: US 8,189,298 B1
(45) Date of Patent: May 29, 2012

(54) DISK DRIVE ACTUATOR HAVING A C-SHAPED BOBBIN WITH WINGS ADJACENT LONGITUDINAL COIL LEGS

(75) Inventors: Yu-Min Lee, Saratoga, CA (US); Arman V. Golgolab, Los Altos, CA (US); Jian Yang, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1006 days.

(21) Appl. No.: 12/163,815

(22) Filed: Jun. 27, 2008

(51) Int. Cl.
*G11B 5/55* (2006.01)
(52) U.S. Cl. .................. 360/264.7; 360/265; 360/265.8
(58) Field of Classification Search .............. 360/264.7, 360/265, 265.8
See application file for complete search history.

(56) References Cited

U.S. PATENT DOCUMENTS

| | | | |
|---|---|---|---|
| 4,879,617 A | 11/1989 | Sampietro et al. | |
| 4,969,058 A | 11/1990 | Williams et al. | |
| 5,168,185 A * | 12/1992 | Umehara et al. | 310/15 |
| 5,305,169 A | 4/1994 | Anderson et al. | |
| 5,404,258 A * | 4/1995 | Arin et al. | 360/265 |
| 5,483,399 A | 1/1996 | Jeong et al. | |
| 5,568,333 A | 10/1996 | Bang | |
| 5,585,981 A | 12/1996 | Lee | |
| 5,621,591 A | 4/1997 | Rahimi et al. | |
| 5,790,348 A | 8/1998 | Alfred et al. | |
| 5,862,019 A | 1/1999 | Larson | |
| 6,061,206 A | 5/2000 | Foisy et al. | |
| 6,078,477 A * | 6/2000 | Adams et al. | 360/265.8 |
| 6,144,530 A | 11/2000 | Shiraishi et al. | |
| 6,181,530 B1 | 1/2001 | Ratliff et al. | |
| 6,252,746 B1 | 6/2001 | Cho | |
| 6,302,626 B1 | 10/2001 | Du et al. | |
| 6,307,717 B1 | 10/2001 | Jeong | |
| 6,404,596 B1 | 6/2002 | McReynolds et al. | |
| 6,480,364 B1 | 11/2002 | Thanomsat et al. | |
| 6,512,658 B1 | 1/2003 | Jierapipatanakul et al. | |
| 6,687,095 B2 * | 2/2004 | McReynolds et al. | 360/265.8 |
| 6,787,941 B2 * | 9/2004 | Takashima | 310/12.08 |
| 6,801,404 B1 | 10/2004 | Oveyssi | |
| 6,847,506 B1 * | 1/2005 | Lin et al. | 360/265.8 |
| 6,867,950 B1 | 3/2005 | Lin | |
| 6,879,466 B1 | 4/2005 | Oveyssi et al. | |
| 6,940,698 B2 | 9/2005 | Lin et al. | |
| 6,947,260 B2 | 9/2005 | Dominguez et al. | |
| 6,970,330 B2 | 11/2005 | Arisaka et al. | |
| 6,980,401 B1 * | 12/2005 | Narayanan et al. | 360/265.8 |

(Continued)

FOREIGN PATENT DOCUMENTS

JP 02114846 A 4/1990

(Continued)

*Primary Examiner* — Jefferson Evans

(57) ABSTRACT

A C-shaped bobbin includes a bobbin base member adjacent and attached to a first lateral leg of an actuator coil. A bobbin recess, adjacent the bobbin base member, separates first and second bobbin wings. The first and second bobbin wings define first and second wing lengths measured parallel to first and second longitudinal legs of the coil, respectively, and also define first and second wing widths measured normal to the first and second longitudinal legs, respectively. The bobbin recess defines a recess depth measured normal to the first lateral leg, and defines a recess width measured parallel to the first lateral leg. Each of the first and second wing lengths is less than the length of the longitudinal legs. The recess depth is at least half a base member width. The recess width is at least twice the first wing width and/or the second wing width.

10 Claims, 3 Drawing Sheets

U.S. PATENT DOCUMENTS

| | | |
|---|---|---|
| 7,675,714 B1 * | 3/2010 | Yucesan et al. ............ 360/265.8 |
| 7,876,533 B2 | 1/2011 | Shin et al. |
| 2002/0167763 A1 * | 11/2002 | Macpherson et al. ...... 360/265.8 |
| 2003/0081355 A1 * | 5/2003 | Arisaka et al. ................ 360/265 |
| 2004/0095682 A1 | 5/2004 | Dominguez et al. |
| 2004/0169961 A1 * | 9/2004 | Lin et al. ....................... 360/265 |
| 2007/0086118 A1 | 4/2007 | Matsumura et al. |
| 2009/0059435 A1 * | 3/2009 | Huang et al. ............... 360/264.7 |

FOREIGN PATENT DOCUMENTS

| | | |
|---|---|---|
| JP | 05184123 A | 7/1993 |
| JP | 2000020979 A | 1/2000 |

* cited by examiner

DISK DRIVE ACTUATOR HAVING A C-SHAPED BOBBIN WITH WINGS ADJACENT LONGITUDINAL COIL LEGS

FIELD OF THE INVENTION

The present invention relates generally to information storage devices, and in particular to actuator coil bobbins for use in disk drive information storage devices.

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), a spindle motor for rotating the disk, and a head stack assembly (HSA). The printed circuit board assembly includes electronics and firmware for controlling the rotation of the spindle and for controlling the position of the HSA, and for providing a data transfer channel between the disk drive and its host.

The spindle typically includes a rotor including one or more rotor magnets and a rotating hub on which disks are mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle hub results in rotation of the mounted disks.

The head stack assembly typically includes an actuator, at least one head gimbal assembly (HGA), and a flex cable assembly. Each HGA includes a head for reading and writing data from and to the disk. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on to an adjacent disk surface. The head is adhered to a suspension assembly that includes a gimbal, load beam, bend region, and swage plate. The suspension acts to preload the head against the surface of the disk.

During operation of the disk drive, the actuator must rotate to position the HGAs adjacent desired information tracks on the disk. The actuator includes a pivot-bearing cartridge to facilitate such rotational positioning. The pivot-bearing cartridge fits into a bore in the body of the actuator. One or more actuator arms extend from the actuator body. An actuator coil is supported by the actuator body, and is disposed opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator.

There is competitive pressure to continually develop hard disk drives that can access data more quickly, and so techniques are continuously being developed to decrease access time. One potential technique to accomplish this is to increase the rotational accelerations with which the head stack assembly is pivoted to position the head over a desired track of information on the disk. Unfortunately, higher rotational accelerations and applied torques on the actuator may lead to increased excitation of certain undesired vibration modes of the actuator. Externally applied mechanical shocks can also excite such actuator vibration modes.

In particular, if the frequency of the so-called "pivot butterfly mode" is too low, and/or if there is inadequate frequency separation between the pivot butterfly mode and the so-called "pivot rocking mode," then the useful bandwidth of effective actuator control may be undesirably reduced. Thus, there is a need in the art for ways to increase the frequency of the pivot butterfly mode of a disk drive actuator, and/or to ensure adequate frequency separation between the pivot butterfly mode and the pivot rocking mode of a disk drive actuator.

SUMMARY

An actuator for a disk drive is disclosed and claimed, and a disk drive incorporating the actuator is also disclosed and claimed. The actuator includes an actuator body having an actuator pivot bore and an actuator arm extending away from the actuator pivot bore along an arm longitudinal axis. A conductive coil is attached to the actuator body. The conductive coil includes first and second lateral legs joined by first and second longitudinal legs to form a closed coil periphery. The first longitudinal leg defines a longitudinal leg length measured generally parallel to the arm longitudinal axis. The first and second lateral legs are each disposed in an orientation that is generally transverse to the arm longitudinal axis. The first lateral leg is disposed closer to the actuator pivot bore than the second lateral leg. A C-shaped bobbin is disposed within the closed coil periphery and is attached to the conductive coil. The C-shaped bobbin includes a bobbin base member adjacent and attached to the first lateral leg. The bobbin base member defines a base member width measured normal to the first lateral leg. A first bobbin wing is adjacent and attached to the first longitudinal leg. The first bobbin wing defines a first wing length measured parallel to the first longitudinal leg and defines a first wing width measured normal to the first longitudinal leg. A second bobbin wing is adjacent and attached to the second longitudinal leg. The second bobbin wing defines a second wing length measured parallel to the second longitudinal leg and defines a second wing width measured normal to the second longitudinal leg. A bobbin recess is between and separates the first and second bobbin wings, and is adjacent the bobbin base member. The bobbin recess defines a bobbin recess depth measured normal to the first lateral leg, and defines a bobbin recess width measured parallel to the first lateral leg. Each of the first and second wing lengths is less than the longitudinal leg length so that the first and second bobbin wings do not contact the second lateral leg. The bobbin recess depth is at least half the base member width. The bobbin recess width is at least twice the first wing width. The bobbin recess width is at least twice the second wing width.

DESCRIPTION OF THE PREFERRED EMBODIMENTS

Figure 1:
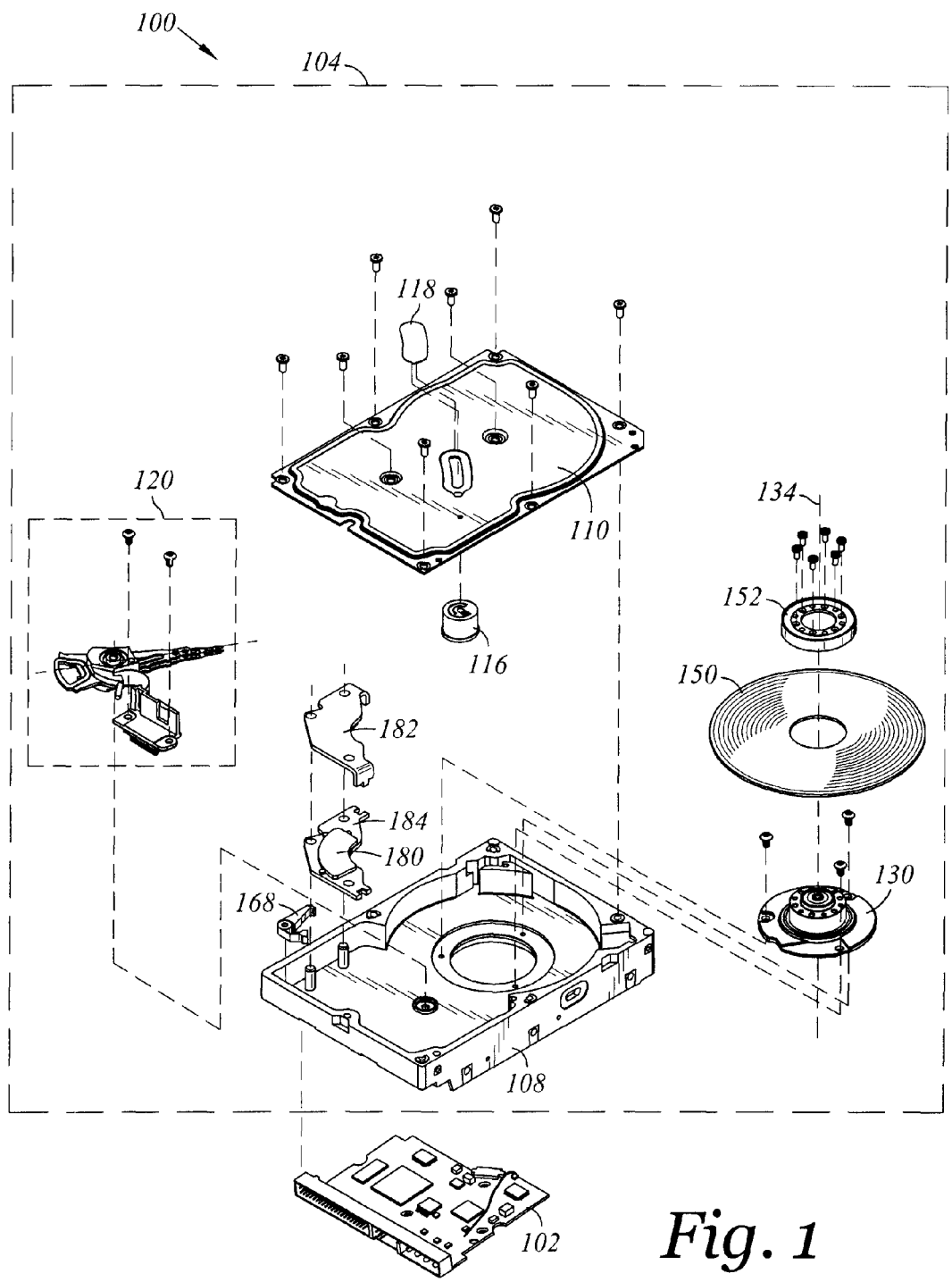
FIG. 1 depicts an exploded perspective view of a disk drive according to an embodiment of the present invention.

FIG. 1 is an exploded perspective view of a disk drive 100 according to an embodiment of the present invention. The disk drive 100 includes a head disk assembly (HDA) 104 and a printed circuit board assembly (PCBA) 102. The PCBA includes conventional circuitry for processing signals and controlling the operations of the disk drive. The HDA 104 includes a base 108 and a cover 110 attached to the base 108 to collectively house at least one disk 150, a spindle 130 attached to the base 108 for rotating disk 150, and a head stack assembly (HSA) 120 rotatably attached to the base 108. The cover 110 may include an opening for a breather filter 116 and a covering 118 for a larger opening for use in servo writing the disk 150. The base 108 is typically attached to the cover 110 by means of screws or other discrete fasteners. The disk 150 may be mounted to the spindle 130 by a disk clamp 152. The spindle 130 rotates the disk 150 at a constant angular velocity about a spindle rotation axis 134.

Figure 2:
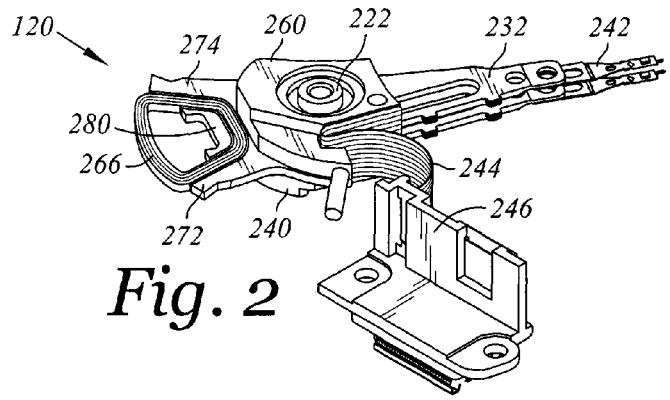
FIG. 2 a head stack assembly according to an embodiment of the present invention.
Figure 3A:
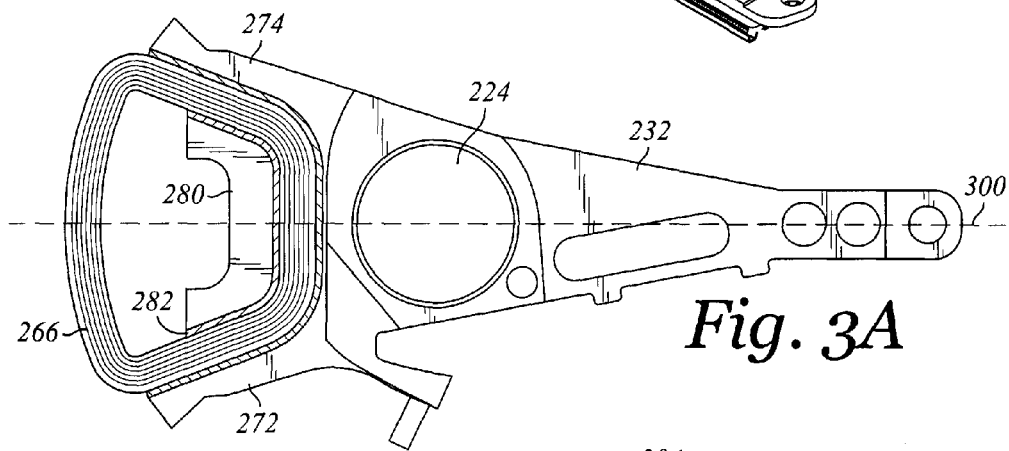
FIG. 3A depicts an actuator according to an embodiment of the present invention.

Now referring additionally to FIGS. 2 and 3A, the HSA 120 comprises a swing-type or rotary actuator 240, at least one head gimbal assembly (HGA) 242, a flex cable 244, and a flex cable bracket 246 fixed to the base 108. The HGA 242 supports a head (not shown) for writing and reading data to and from the disk 150. In magnetic recording hard disk drive applications, the head may include a magneto resistive sensor for reading data from disk 150, and a longitudinal or perpendicular type inductive transducer for writing data to disk 150. In optical or magneto-optical recording applications, the head may include an objective lens for focusing laser light upon the recording media surface. The storage capacity of the disk drive 100 may be increased by the use of additional disks and by the HSA 120 having correspondingly more HGAs supported by multiple actuator arms.

The rotary actuator 240 includes an actuator body 260 having a pivot bore 224 for receipt of pivot-bearing cartridge 222. In certain embodiments, the actuator body 260 may be fabricated of a metal material such as aluminum, stainless steel, magnesium, beryllium, or an alloy thereof, by casting and/or forging. At least one actuator arm 232 is cantilevered from the actuator body 260, and defines an arm longitudinal axis 300. A coil 266 is cantilevered from the actuator body 260 in a direction that is generally (but not necessarily exactly) opposite from the actuator arm 232. The coil 266 is attached to the actuator body 260 and supported by coil fork prongs 272, 274, for example by being bonded to the actuator body 260 and the coil fork prongs 272, 274 by an adhesive.

A C-shaped coil bobbin 280 is bonded within the coil 266, for example by adhesive layer 282. The C-shaped coil bobbin 280 is preferably but not necessarily fabricated from a metal material. That is, the C-shaped geometry of coil bobbin 280 may, in certain embodiments, advantageously allow the use of a metal bobbin material. A metal material may be practical in the embodiment of FIGS. 2 and 3A because eddy currents may be reduced by the C-shaped geometry, whereas other bobbin geometries may require a non-metal material to reduce eddy currents. Non-metal bobbin materials have more difficulty conducting heat away from the coil 266, and may have a larger difference in coefficient of thermal expansion relative to the material of the actuator body 260 that can stress adhesive bonds.

The HSA 120 is rotably affixed to the base 108 via a pivot-bearing cartridge 222 mounted through the pivot bore 224 of the actuator body 260 of the HSA 120, so that the pivot axis of the HSA is substantially parallel to the spindle rotation axis 134. A voice coil motor (VCM) includes top and bottom VCM plates 182, 184 mounted to the base 108. One or both of the VCM plates includes a permanent magnet (e.g. permanent magnet 180) and the VCM plates 182, 184 form a yoke to carry magnetic flux from the permanent magnet(s). The coil 266 of the actuator assembly 240 is disposed between the top and bottom VCM plates 182 and 184 to cause pivoting of the HSA 120 about the pivot axis defined by the pivot bearing cartridge 222 in response to an electrical current passed through the coil 266. In this way, the VCM controllably positions the head(s) of the HSA 120 relative to the disk 150 for writing and/or reading data. The angular range of HSA pivoting may be limited by one or more stops, and the HSA may be held adjacent a stop by a latch (e.g. actuator latch 168).

Figure 3B:
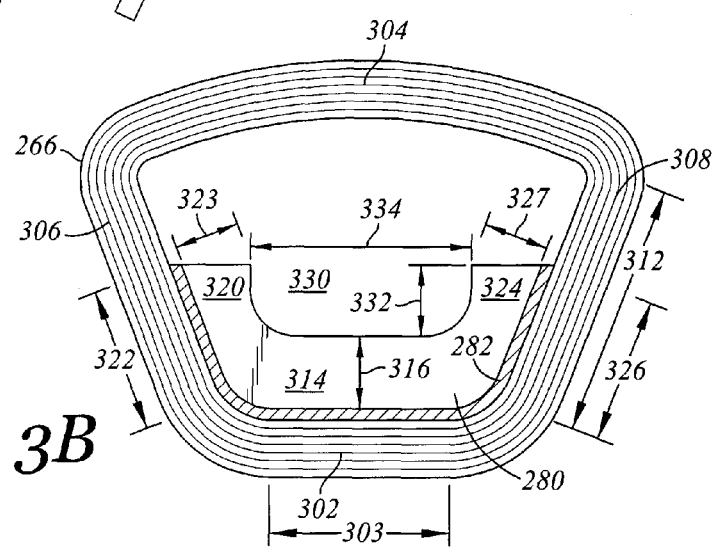
FIG. 3B depicts an actuator coil assembled with a coil bobbin according to an embodiment of the present invention.

Now referring additionally to FIG. 3B, the actuator coil 266 is assembled with the C-shaped coil bobbin 280 according to an embodiment of the present invention. Conductive coil 266 includes a first lateral leg 302 and a second lateral leg 304, joined by a first longitudinal leg 308 and a second longitudinal leg 306, to form a closed coil periphery. The first longitudinal leg 308 defines a longitudinal leg length 312 measured generally parallel to the arm longitudinal axis 300, but not necessarily precisely parallel to the arm longitudinal axis 300. For example, the coil may be a so-called dog-leg coil that is skewed 5 degrees or so relative to the arm longitudinal axis. Also for example, the first longitudinal leg 308 and the second longitudinal leg 306 may have radial orientations that are mostly along the longitudinal axis, but not precisely so since each may be radial with respect to the center of the pivot bore 224. In such an example, the first and second longitudinal legs 308, 306, though approximately and generally parallel to the longitudinal axis, would be (more precisely) diverging as radiuses originating and intersecting at the actuator pivot bore 224. In any case, the first and second longitudinal legs 308, 306, are far closer to being parallel to the longitudinal axis than to being orthogonal to it.

The first lateral leg 302 and the second lateral leg 304 may each be disposed in an orientation that is generally transverse to the arm longitudinal axis 300. It is not necessary that the first lateral leg 302 and the second lateral leg 304 be precisely orthogonal to the arm longitudinal axis 300 to be considered "generally transverse" to the arm longitudinal axis 300. Rather, the first lateral leg 302 and the second lateral leg 304 may be considered as "generally transverse" to the arm longitudinal axis 300 if they are much closer to being orthogonal to the longitudinal axis 300 than to being parallel to it. For example, although the second lateral leg 304 is shown in FIGS. 3A and 3B to be curved, it is everywhere disposed in an orientation that is "generally transverse" to the arm longitudinal axis 300. Note also that the first lateral leg 302 is disposed closer to the actuator pivot bore 224 than is the second lateral leg 304. The first lateral leg 302 defines a first lateral leg length 303 measured generally transverse to the arm longitudinal axis 300.

In the embodiment of FIG. 3B, the C-shaped bobbin 280 is disposed within the closed periphery of conductive coil 266 and is attached to the conductive coil 266 by adhesive 282. The C-shaped bobbin 280 includes a bobbin base member 314 adjacent and attached to the first lateral leg 302. The bobbin base member 314 defines a base member width 316, measured normal to the first lateral leg 302.

The C-shaped bobbin 280 also includes a first bobbin wing 324 adjacent and attached to the first longitudinal leg 308. The first bobbin wing 324 defines a first wing length 326 measured parallel to the first longitudinal leg 308 and defines a first wing width 327 measured normal to the first longitudinal leg 308. The first wing length 326 is preferably in the range of ⅓rd to ⅘th the longitudinal leg length 312. Also, the base member width 316 is preferably in the range of ⅛th to ⅓rd of the longitudinal leg length 312.

The C-shaped bobbin 280 also includes a second bobbin wing 320 adjacent and attached to the second longitudinal leg 306. The second bobbin wing 320 defines a second wing length 322 measured parallel to the second longitudinal leg 306 and defines a second wing width 323 measured normal to the second longitudinal leg 306. The second wing length 322 is preferably in the range of ⅓rd to ⅘th the longitudinal leg length 312.

In the embodiment of FIG. 3B, the first and second wing lengths 326, 322 are preferably but not necessarily equal, and the first and second wing widths 327, 323 are preferably but not necessarily equal. Such equalities may be beneficial from a manufacturing viewpoint if they allow the C-shaped bobbin 280 to be installed with either of its two opposing major faces upward, however an inequality in one or more of these dimensions may be deliberately chosen to counteract some other imbalance in the actuator or coil.

The C-shaped bobbin 280 also includes a bobbin recess 330 between and separating the first and second bobbin wings 324, 320, and adjacent the bobbin base member 314. The bobbin recess 330 defines a bobbin recess depth 332, measured normal to the first lateral leg 302. The bobbin recess depth 332 is preferably in the range ¼th to ⅔rd the longitudinal leg length 312. The bobbin recess 330 also defines a bobbin recess width 334, measured parallel to the first lateral leg 302. The first wing width 327 is preferably in the range of ⅛th to ½ the bobbin recess width 334. Also, the second wing width 323 is preferably in the range of ⅛th to ½ the bobbin recess width 334. In certain embodiments, the bobbin recess width is preferably in the range of ⅗th to ⅚th the first lateral leg length 303. The foregoing and following dimensional restrictions may, in certain embodiments, help ensure adequate bobbin compliance and/or acceptable frequency separation between the pivot butterfly mode and the pivot rocking mode of a disk drive actuator In the embodiment of FIG. 3B, each of the first and second wing lengths 326, 322 is less than the longitudinal leg length 312, so that the first and second bobbin wings 324, 320 do not contact the second lateral leg 304. Also in the embodiment of FIG. 3B, the bobbin recess depth 332 is at least half the base member width 316. FIG. 3B also shows that the bobbin recess width 334 is at least twice the first wing width 327, and the bobbin recess width 334 is at least twice the second wing width 323.

Figure 4:
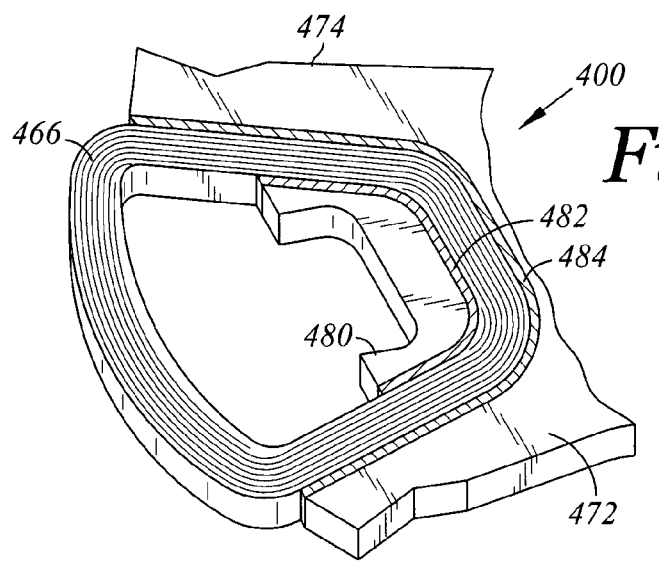
FIG. 4 depicts a portion of an actuator according to an embodiment of the present invention.

FIG. 4 depicts a portion of an actuator 400 according to an embodiment of the present invention. In the embodiment of FIG. 4, conductive coil 466 is attached to the body of actuator 400, and to coil fork prongs 472 and 474 by adhesive layer 484. C-shaped coil bobbin 480 is attached to the conductive coil 466 within the closed periphery of conductive coil 466 by adhesive layer 482. The C-shaped coil bobbin 480 of FIG. 4 is fabricated from a single layer of material (e.g. metal), however it could be fabricated from more than one layer as shown in FIG. 5.

Figure 5:
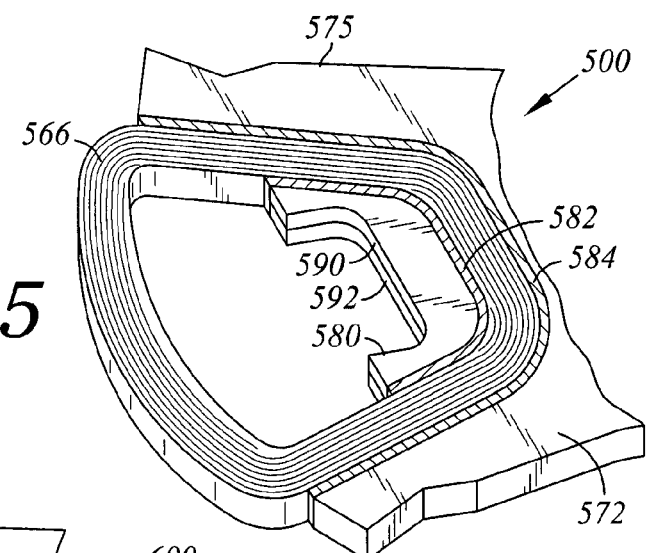
FIG. 5 depicts a portion of an actuator according to another embodiment of the present invention.

FIG. 5 depicts a portion of an actuator 500 according to another embodiment of the present invention. In the embodiment of FIG. 5, conductive coil 566 is attached to the body of actuator 500, and to coil fork prongs 572 and 575 by adhesive layer 584. C-shaped coil bobbin 580 is attached to the conductive coil 566 within the closed periphery of conductive coil 566 by adhesive layer 582. In the embodiment of FIG. 5, the C-shaped coil bobbin 580 is fabricated from a two-layer laminate so that it includes two bobbin layers 590, 592, however it is contemplated that more than two layers may be used. An air gap may exist between the layers of the bobbin so that the bobbin may function more efficiently (e.g. as fins) to convect heat away from the coil, as shown in FIG. 6.

Figure 6:
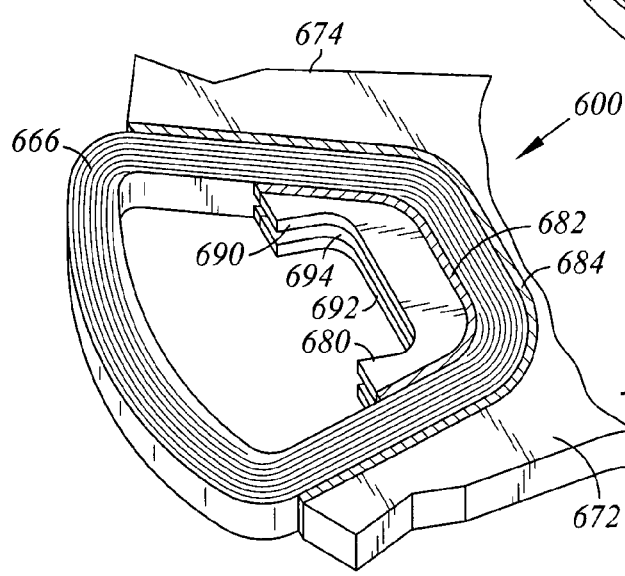
FIG. 6 depicts a portion of an actuator according to another embodiment of the present invention.

FIG. 6 depicts a portion of an actuator 600 according to another embodiment of the present invention. In the embodiment of FIG. 6, conductive coil 666 is attached to the body of actuator 600, and to coil fork prongs 672 and 674 by adhesive layer 684. C-shaped coil bobbin 680 is attached to the conductive coil 666 within the closed periphery of conductive coil 666 by adhesive layer 682. In the embodiment of FIG. 6, the C-shaped coil bobbin 680 includes two separate metal bobbin layers 690, 692, with an air gap 694 in between. The air gap may increase the efficiency with which the separate metal bobbin layers 690, 692 can convect heat away from coil 666 during operation.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

We claim:

1. An actuator for a disk drive, the actuator comprising:
an actuator body having an actuator pivot bore and an actuator arm extending away from the actuator pivot bore along an arm longitudinal axis;
a conductive coil attached to the actuator body, the conductive coil including first and second lateral legs joined by first and second longitudinal legs to form a closed coil periphery, the first longitudinal leg defining a longitudinal leg length measured generally parallel to the arm longitudinal axis, the first and second lateral legs each being disposed in an orientation that is generally transverse to the arm longitudinal axis, the first lateral leg being disposed closer to the actuator pivot bore than the second lateral leg; and
a C-shaped bobbin disposed within the closed coil periphery and attached to the conductive coil, the C-shaped bobbin including
a bobbin base member adjacent and attached to the first lateral leg, the bobbin base member defining a base member width measured normal to the first lateral leg;
a first bobbin wing adjacent and attached to the first longitudinal leg, the first bobbin wing defining a first wing length measured parallel to the first longitudinal leg and defining a first wing width measured normal to the first longitudinal leg;
a second bobbin wing adjacent and attached to the second longitudinal leg, the second bobbin wing defining a second wing length measured parallel to the second longitudinal leg and defining a second wing width measured normal to the second longitudinal leg; and
a bobbin recess between and separating the first and second bobbin wings and adjacent the bobbin base member, the bobbin recess defining a bobbin recess depth measured normal to the first lateral leg and a bobbin recess width measured parallel to the first lateral leg;

wherein each of the first and second wing lengths is less than the longitudinal leg length so that the first and second bobbin wings do not contact the second lateral leg, the bobbin recess depth is at least half the base member width, the bobbin recess width is at least twice the first wing width, and the bobbin recess width is at least twice the second wing width.

2. The actuator of claim 1 wherein the first and second wing lengths are equal.

3. The actuator of claim 1 wherein the first and second wing widths are equal.

4. The actuator of claim 1 wherein the first wing length is in the range of 1/3rd to 4/5th the longitudinal leg length.

5. The actuator of claim 1 wherein the first wing width is in the range of 1/8th to 1/2 the bobbin recess width.

6. The actuator of claim 1 wherein the base member width is in the range of 1/8th to 1/3rd the longitudinal leg length.

7. The actuator of claim 1 wherein the bobbin recess depth is in the range 1/4th to 2/3rd the longitudinal leg length.

8. The actuator of claim 1 wherein the C-shaped bobbin comprises a metal material.

9. The actuator of claim 1 wherein the first lateral leg defines a first lateral leg length measured generally transverse to the arm longitudinal axis, and wherein the bobbin recess width is in the range of 3/5th to 6/5th the first lateral leg length.

10. A disk drive comprising:
a disk drive base;
a spindle rotably coupled to the disk drive base, and a disk attached to the spindle; and
an actuator, the actuator including:
an actuator body having an actuator pivot bore and an actuator arm extending away from the actuator pivot bore along an arm longitudinal axis;
a conductive coil attached to the actuator body, the conductive coil including first and second lateral legs joined by first and second longitudinal legs to form a closed coil periphery, the first longitudinal leg defining a longitudinal leg length measured generally parallel to the arm longitudinal axis, the first and second lateral legs each being disposed in an orientation that is generally transverse to the arm longitudinal axis, the first lateral leg being disposed closer to the actuator pivot bore than the second lateral leg; and
a C-shaped bobbin disposed within the closed coil periphery and attached to the conductive coil, the C-shaped bobbin including
a bobbin base member adjacent and attached to the first lateral leg, the bobbin base member defining a base member width measured normal to the first lateral leg;
a first bobbin wing adjacent and attached to the first longitudinal leg, the first bobbin wing defining a first wing length measured parallel to the first longitudinal leg and defining a first wing width measured normal to the first longitudinal leg;
a second bobbin wing adjacent and attached to the second longitudinal leg, the second bobbin wing defining a second wing length measured parallel to the second longitudinal leg and defining a second wing width measured normal to the second longitudinal leg; and
a bobbin recess between and separating the first and second bobbin wings and adjacent the bobbin base member, the bobbin recess defining a bobbin recess depth measured normal to the first lateral leg and a bobbin recess width measured parallel to the first lateral leg;

wherein each of the first and second wing lengths is less than the longitudinal leg length so that the first and second bobbin wings do not contact the second lateral leg, the bobbin recess depth is at least half the base member width, the bobbin recess width is at least twice the first wing width, and the bobbin recess width is at least twice the second wing width.

* * * * *